US 008694327B2

(12) United States Patent
Kolodziej et al.

(10) Patent No.: US 8,694,327 B2
(45) Date of Patent: Apr. 8, 2014

(54) ELECTRONIC WARRANTY SYSTEM AND METHOD

(75) Inventors: Ryan Henry Kolodziej, Nampa, ID (US); Frederick D. Reynolds, Nampa, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 4045 days.

(21) Appl. No.: 10/230,808

(22) Filed: Aug. 29, 2002

(65) Prior Publication Data

US 2004/0046033 A1    Mar. 11, 2004

(51) Int. Cl.
*G06Q 10/00* (2012.01)
(52) U.S. Cl.
USPC ....... 705/1; 705/4; 705/26; 705/302; 705/300
(58) Field of Classification Search
USPC ................................................ 705/1; 347/19
See application file for complete search history.

(56) References Cited

U.S. PATENT DOCUMENTS

| 3,889,407 | A | | 6/1975 | Elzer | |
|---|---|---|---|---|---|
| 6,094,639 | A | * | 7/2000 | Kubota | 705/1.1 |
| 6,158,837 | A | * | 12/2000 | Hilton et al. | 347/19 |
| 6,163,693 | A | | 12/2000 | Rydbeck | |
| 6,208,853 | B1 | | 3/2001 | Lo Vasco et al. | |
| 6,240,286 | B1 | | 5/2001 | Rydbeck | |
| 6,325,630 | B1 | * | 12/2001 | Grabmayr | 434/157 |
| 6,366,199 | B1 | | 4/2002 | Osborn et al. | |
| 6,965,866 | B2 | * | 11/2005 | Klein | 705/302 |

* cited by examiner

*Primary Examiner* — Calvin Loyd Hewitt, II
*Assistant Examiner* — Cristina Owen Sherr

(57) ABSTRACT

An electronic warranty unit and method. In one embodiment the electronic warranty unit includes a programmable electronic memory unit configured for removable insertion into a device and an electronic warranty stored on the electronic memory unit. A method for electronically warranting a device includes removably attaching an electronic warranty unit, capable of storing an electronic warranty for the device, to the device or removably inserting the electronic warranty unit into the device.

8 Claims, 6 Drawing Sheets

ELECTRONIC WARRANTY SYSTEM AND METHOD

THE FIELD OF THE INVENTION

The present invention relates to warranties and in particular to electronic warranties.

BACKGROUND OF THE INVENTION

Many times, purchasing a warranty for a product can be just as important as deciding which product to purchase. Unfortunately, most people have become weary of transactions surrounding warranties for several reasons.

Most standard warranties that come with a product require that the consumer fill out a questionnaire detailing their personal profile, as well as a model number, serial number, purchase date, store information, copy of receipt, etc. The consumer then has the worry of keeping the warranty papers in a safe place, along with the original sales receipts and paperwork. All of this paperwork is usually stored separately from the product covered by the warranty, thereby creating the risk of losing the warranty paperwork. Finally, the consumer must try to remember all the different warranty terms for many different products so that when a product failure does occur, the consumer can remember to avail themselves of the warranty.

Many retailers sell extended warranties as a last step in the sales process. Once a consumer has finally decided to purchase an item, they are faced with extra pressure to buy an extended warranty. This last step can sour a customer's buying experience. Considering all of these factors, obtaining a warranty and/or implementing a warranty remains inconvenient and can even be difficult.

SUMMARY OF THE INVENTION

The present invention provides an electronic warranty system and method. In one embodiment, an electronic warranty unit of the present invention includes a programmable electronic memory unit configured for removable insertion into a device. An electronic warranty is stored on the electronic memory unit.

DESCRIPTION OF THE PREFERRED EMBODIMENTS

Figure 1:
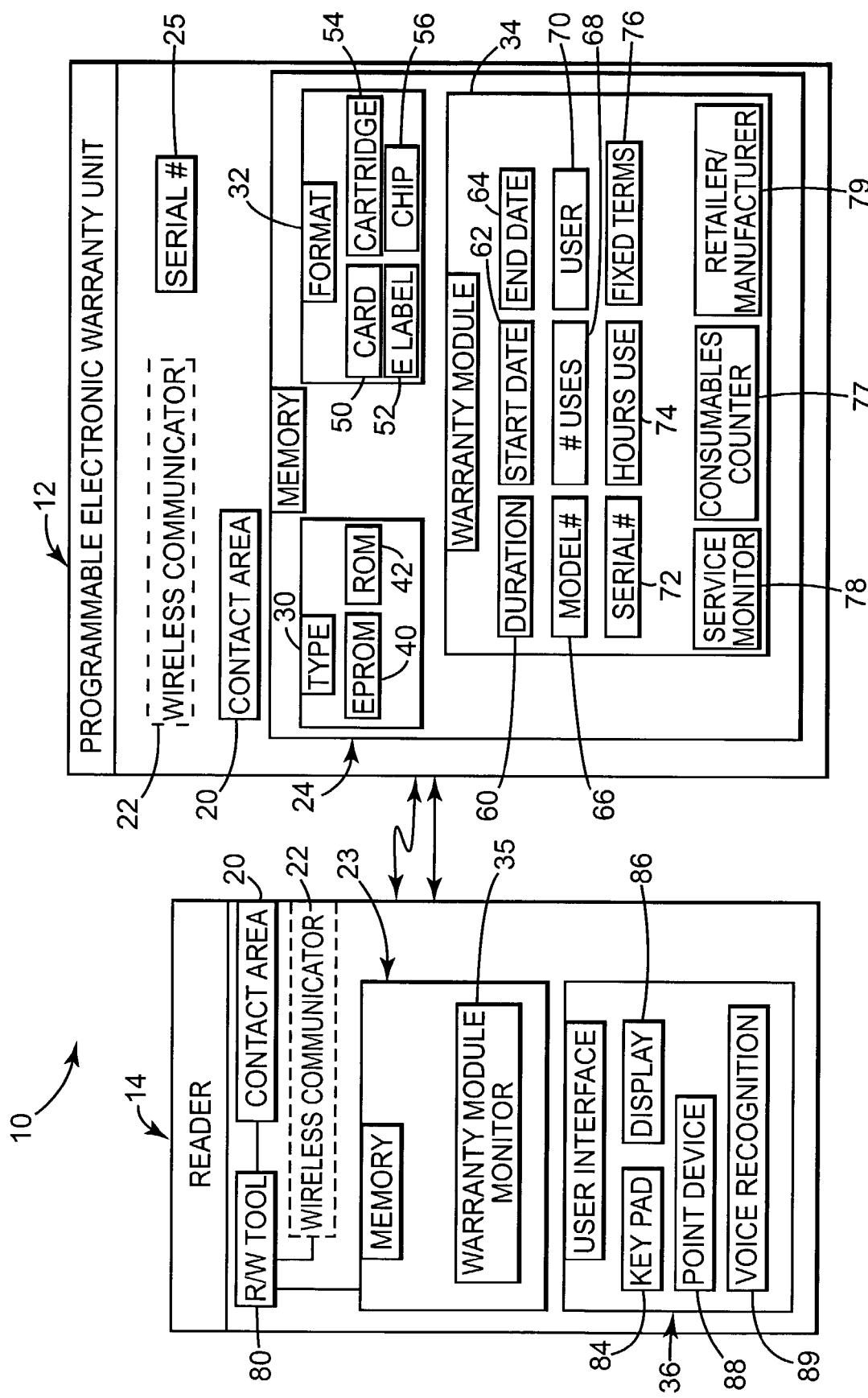
FIG. 1 is a block diagram illustrating an electronic warranty system, according to one embodiment of the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Components of the present invention may be implemented in hardware via a microprocessor, programmable logic, or state machine, in firmware, or in software within a given device. Components of the present invention may reside in software on one or more computer-readable media. The term computer-readable media as used herein is defined to include any kind of memory, volatile or non-volatile, such as floppy disks, hard disks, CD-ROMs, flash memory, read-only memory (ROM), and random access memory (RAM).

Preferably, the user interfaces described herein run on a controller, computer, appliance or other device having an operating system which can support one or more applications. The operating system is stored in memory and executes on a processor. The operating system is preferably a multi-tasking operating system which allows simultaneous execution of multiple applications, although aspects of this invention may be implemented using a single-tasking operating system. The operating system employ a graphical user interface windowing environment which presents the applications or documents in specially delineated areas of the display screen called "windows." The operating system preferably includes a windows-based dynamic display which allows for the entry or selection of data in dynamic data field locations via an input device such as a keyboard and/or mouse. One preferred operating system is a Windows® brand operating system sold by Microsoft Corporation. However, other operating systems which provide windowing environments may be employed, such as Linux and those available from Apple Corporation or IBM. In another embodiment, the operating system does not employ a windowing environment.

A system and method of the present invention for electronically warranting a product revolutionizes warranties. Purchasers can initiate purchase of a warranty electronically without filling out paperwork and without dealing with a salesperson. The terms of the warranty are already contained within an electronic warranty unit or can be written into the electronic warranty unit. Registration of the warranty preferably is performed electronically at the time of purchase. However, warranty registration also can take place later electronically from a device incorporating the electronic warranty unit to a warranty service provider through a network communication link. Once installed and/or activated, the electronic warranty unit acts as a resident warranty that is always with the warranted device. This feature insures that the warranty will not be lost or separated from the warranted device and is always available to the owner, service technician, and/or service provider of the warranty.

In one exemplary embodiment of the present invention, electronic warranty system 10 includes programmable electronic warranty unit 12 and reader 14. Electronic warranty unit 12 is programmable to carry an electronic warranty that specifies the terms or parameters of the warranty as well as identification of the device and/or purchaser for which the warranty is registered. Reader 14 communicates with electronic warranty unit 12 either to read and/or activate the contents of electronic warranty unit 12, as well as to write some or all of the electronic contents of a warranty to electronic warranty unit 12.

Electronic warranty unit 12 includes electrical contact area 20, optional wireless communicator 22, memory 24, and serial number 25. Memory 24 comprises memory type 30, memory format 32, and warranty module 34. Memory type 30 includes erasable programmable read only memory (EPROM) 40 and read only memory (ROM) 42. Memory format 32 includes memory card 50, electronic label 52, cartridge 54, and memory chip 56. Warranty module 34 includes duration 60, start date 62, end date 64, model number 66, number of uses 68, user 70, serial number 72, hours of use 74, fixed terms 76, consumables counter 77, service monitor 78, and retailer/manufacturer identification 79.

Reader 14 includes electrical contact area 20, optional wireless communicator 22, memory 23 including warranty module monitor 35, and user interface 36. Reader 14 also includes read/write (R/W) tool 80. User interface 36 includes keypad 84, display 86, pointing device 88, and voice recognition module 89.

Electronic warranty unit 12 stores an electronic warranty and includes components for communicating with reader 14. In particular, electrical contact area 20 of electronic warranty unit 12 comprises electrically conductive elements for establishing electronic communication with an electrically conductive contact area 20 of another device, such as reader 14. Electrical contact area 20 preferably is provided in the forms of well known electrically conductive contact pins, card-receiving slot, etc. that are suited for removably establishing contact with a reciprocating electrically conductive contact element.

Optional wireless communicator 22 includes any form of electronic circuitry for establishing wireless communication between electronic warranty unit 12 and another device such as reader 14. Wireless communicator 22 can include wireless telecommunication technologies, Bluetooth, 802.11, Infra-Red as well as other wireless protocols and communication pathways. In these examples, both electronic warranty unit 12 and reader 14 would each require a sender and a receiver as part of wireless communicator 22.

Wireless communicator 22 of reader 14 uses one or more known communication and application protocols such as Wireless Application Protocol (WAP), Bluetooth, Infrared (IRDA, FIR), 802.11 (popularly known as WiFi), as well as other communication and application protocols known to those skilled in the art, such as UltraWideBand (UWB). Wireless communicator 22 includes communication hardware and software known in the art for implementing these protocols. Wireless communication protocols such as infrared (e.g., FIR), Bluetooth, and UltraWide Band (UWB) permit direct radio or beamed communication between two or more compatible devices that operate independently of a network and independently of a network communication link. This feature permits direct one-on-one communication between two similarly configured devices without any communication intermediary. In the example of the Bluetooth protocol, the communication link preferably is established by the mere presence of each respective device (e.g., reader 14 and electronic warranty unit 12) in close proximity to each other. This instant synchronization enables the devices to immediately communicate with each other without taking time to manually establish a connection or communication link.

Wireless communicator 22 of electronic warranty unit 12 also optionally comprises a low profile system such as the type of flexible circuitry employed in ink jet print cartridges as an electronic circuit label 52 adhered to an ink jet print cartridge The electronic label of flexible circuitry includes an induction coil and a complementary reader, typically mounted on a print head of a printer, couples with the coil to form a transformer. An alternating current is then used to transmit information electronically in a binary switch format between the induction coil on the flexible circuitry of the ink jet print cartridge and the reader on the print head. The flexible circuitry preferably includes a memory component. This type of flexible circuitry in an electronic label format is available from Hewlett Packard of Palo Alto and is known in the art, such as in U.S. Pat. Nos. 6,273,554 and 4,706,097, which are hereby incorporated by reference. In addition, to embodying wireless communicator 22, such electronic circuitry labels can embody the entire electronic warranty unit 12.

Memory 24 of electronic warranty unit 12 stores the electronic warranty, which includes the parameters in warranty module 34, and with one of the memory types 20 and memory formats 32. Memory type 30 identifies the type of memory 24 carried by electronic warranty unit 12 for containing an electronic warranty and which may include one or both of erasable programmable read only memory (EPROM) 40 and read only memory (ROM) 42.

Memory format 32 identifies the format of memory 24 carried by electronic warranty unit 12 and includes a removably insertable device such as memory card 50, electronic label 52, cartridge 54, and memory chip 56. Memory card 50 can include a smart card, flash memory card, etc., as well as a dual in line memory module (dimm) or single in line memory module (simm). Electronic label 52 comprises a flexible electronic circuit label, as previously described in association with wireless communicator 22 of FIG. 1. Electronic label 52 is affixed to a carrier such as a print cartridge (as described in association with wireless communicator 22), or is backed by a pressure sensitive adhesive for applying as a sticker to an appliance or device. Cartridge 54 preferably comprises a removably insertable memory cartridge as well as an ink jet print cartridge bearing electronic warranty unit 12 embodied as electronic label 52.

Warranty module 34 comprises an electronic warranty that is writable to and/or stored in memory 24. Warranty module 34 preferably comprises different parameters of the electronic warranty such as duration 60 of the warranty, warranty start date 62, and/or warranty end date 64. Other warranty parameters include model number 66, user 70 and/or serial number 72 of the warranted device. These parameters are entered prior to or at time of purchase and/or entered later electronically via network communication link 228. Additional warranty parameters include number of uses 68, hours of use 74, fixed warranty terms 76, and consumables counter 77 that tracks consumables, such as the amount of ink used in a printer cartridge.

Service monitor 78 of warranty module 34 comprises a program and/or information for prompting a user via user interface 36 of reader 14 (or of a warranted device) of scheduled service tasks for tracking and reporting of maintenance and for communicating time-sensitive warranty information.

Retailer/manufacturer identification 79 of warranty module 34 identifies. information about a retailer from which the product or warranty was purchased and/or information about a manufacturer that made the product. This information includes customer service contact information, device operations information (e.g. owner's manual), etc. This specific information about a retailer and/or manufacturer is written to electronic warranty unit 12 at the time of purchase, or pre-programmed into electronic warranty unit 12 prior to the time of purchase.

Serial number 25 of electronic warranty unit 12 is unique to electronic warranty unit 12 so that a warranty service provider and/or retailer can track all available and purchased electronic warranty units 12. Using serial number 25, the warranty service provider and/or retailer can determine from a database the parameters of the registered electronic warranty for that electronic warranty unit 12 bearing that serial number 25. However, serial number 25 is also optionally programmable to match the serial number of the warranted device so that electronic warranty unit 12 and the warranted device have the same serial number.

Reader 14 communicates with electronic warranty unit 12 to read and/or write warranty information into warranty module 34 of electronic warranty unit 12. Accordingly, reader 14 includes memory 23 with warranty module monitor 35 that contains the electronic warranty that is read from and/or written to electronic warranty unit 12, and which includes parameters that are substantially the same as electronic warranty in warranty module 34 in electronic warranty unit 12.

Memory 23 of reader 14 preferably includes a high capacity random access memory system available on an integrated circuit chip, such as SDRAM, DRAM, EDO RAM, etc.

R/W tool 80 of reader 14 is a read/write head capable of reading and writing to memory 23 and warranty module 34 in memory 24 of electronic warranty unit 12. R/W tool 80 is in electrical communication with contact area 20 and/or wireless communicator 22 of reader 14, either of which convey communications between R/W tool 80 of reader 14 and memory 24 of electronic warranty unit 12 via reciprocating contact area 20 and wireless communicator of electronic warranty unit 12.

User interface 36 of reader 14 allows a purchaser to view, enter, and/or hear warranty information on electronic warranty unit 12 via reader 14. Information is entered and/or selected by keypad 84, pointing device 88 (e.g., mouse, touchscreen), and/or voice recognition module 89. Information is viewed on display 86 and/or audibly broadcast by voice recognition module 89. In particular, user interface 36 of reader 14 is used to review electronic warranty in electronic warranty unit 12 and/or write some or all of electronic warranty to electronic warranty unit 12 from warranty module monitor 35 of reader 14. User interface 36 of reader 14 optionally prompts a user or technician for a service call, warranty service, warranty expiration, etc.

User interface 36 of reader 14 is implemented in hardware via a microprocessor, programmable logic device, or state machine, and firmware, or in software. In one aspect, at least a portion of the software programming is optionally written in Java programming language. For example, the present invention optionally can use a TCP/IP protocol suite for data transport. In another aspect, the present invention does not use a TCP/IP protocol suite for data transport.

Electronic warranty system 10 is used in method 100 of the present invention, or in other uses and methods as described throughout this application.

Figure 2:
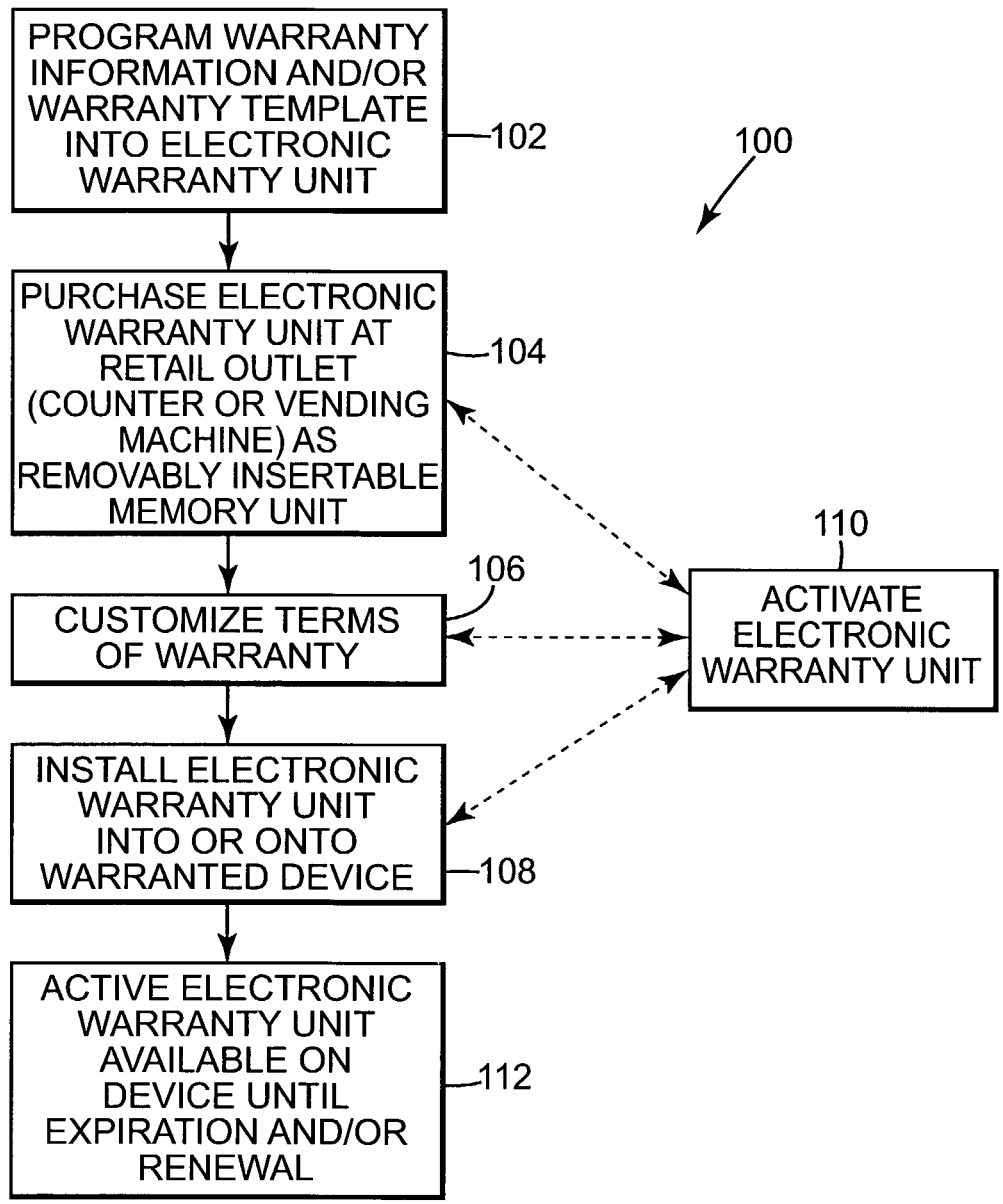
FIG. 2 is flow diagram illustrating a method of electronically warranting a device, according to one embodiment of the present invention.

As shown in FIG. 2, method 100 of the present invention of electronically warranting a device includes a first step 102 of programming an electronic warranty and/or a warranty template into electronic warranty unit 12. An electronic warranty includes the information identified in warranty module 34 (FIG. 1) while a warranty template comprises the data fields of the parameters of the electronic warranty as detailed in warranty module 34.

Next, in step 104, electronic warranty unit 12 is purchased at a retail point-of-purchase environment, such as a retail sales counter or vending machine. Electronic warranty unit 12 is preferably sold as a removably insertable memory unit embodied as any one of memory types 30 and/or memory formats 32 (e.g., dimm, simm, electronic label) identified in FIG. 1. This retail point-of-purchase environment is described later in greater detail in association with FIG. 7.

The electronic warranty stored on electronic warranty unit 12 is optionally customized in step 106. A retails sales clerk can customize the stored electronic warranty by entering additional warranty data into electronic warranty unit 12 using reader 14 or other memory writing station. Alternatively, where the purchase is made from a vending machine (FIG. 7), the vending machine optionally writes additional warranty data into electronic warranty unit 12 to customize the electronic warranty. Customization can include setting or adding parameters unique to the user such as specifying the serial number of the machine, specifying the user name of the warranted device, and/or specifying a unique duration of the warranty and/or threshold (such as a page count of a printer) of the warranty. Of course, any customized parameters sought by the consumer must fall within established criteria and boundaries for the warranty as set by the warranty service provider.

In a next step 108, the purchaser then installs electronic warranty unit 12 into or onto the warranted device. Installation preferably occurs by inserting electronic warranty unit 12 into a receiving mechanism (e.g. slot 160) of the warranted device. For example, where electronic warranty unit 12 is embodied in a memory card format 50 (e.g., simm, dimm), the memory card is inserted into an open expansion card slot or memory card slot of the warranted device. Where electronic warranty unit 12 is embodied in an electronic label format 52, the label is applied with an adhesive tape to a body of the warranted device. Alternatively, the electronic label 52 can be part of a cartridge 54 such as an ink jet print cartridge.

Electronic warranty unit 12 preferably defines additional memory 24 for the warranted device, or communicates with existing memory 23 of the warranted device so that the electronic warranty becomes part of the warranted device. This interaction, and further examples of installation of electronic warranty unit 12, will be described in greater detail in association with FIGS. 3-9.

Figure 7:
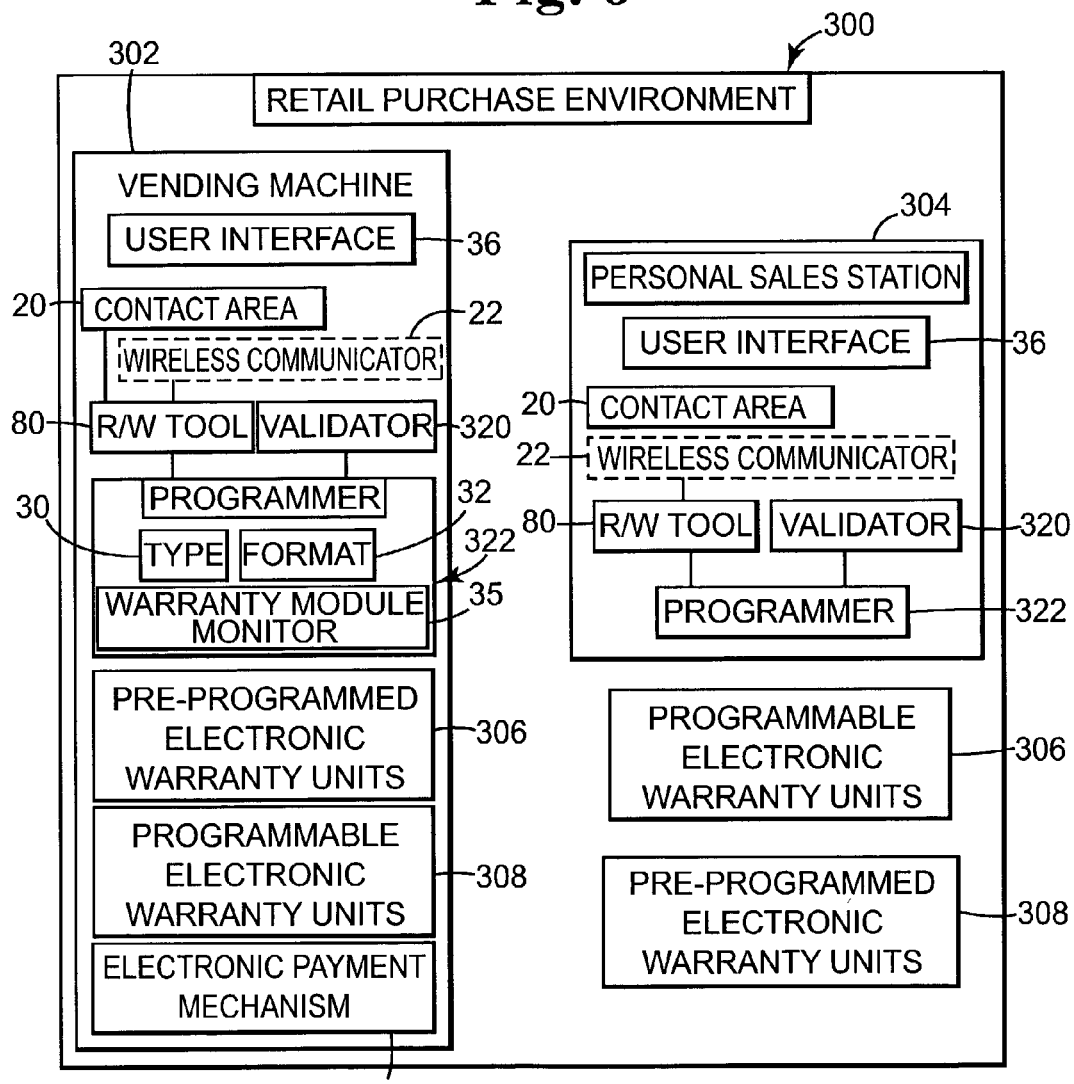
FIG. 7 is a block diagram illustrating a retail point-of-purchase environment for purchasing an electronic warranty, according to one embodiment of the present invention.

During any one of steps 104-108 of method 100, step 110 of activating electronic warranty unit 12 can be activated and completed. An electronic warranty of electronic warranty unit 12 is activated by a sales clerk or the vending machine (FIG. 7). At the same time, a serial number of the warranted device and/or user name of the purchaser is obtained and stored as part of the electronic warranty. This information is then associated with serial number 25 of electronic warranty unit 12 and with the parameters of the electronic warranty on electronic warranty unit 12. At some point during or after the purchase, the information about the purchaser, warranted device, and electronic warranty unit 12 are forwarded to a warranty service provider for central registration of the warranty. While the warranty service provider preferably is the manufacturer of the warranted device, a retailer or general warranty company also can provide the warranty.

Finally, in step 112, the electronic warranty in electronic warranty unit 12 remains actively available on the warranted device until expiration and/or renewal of the warranty.

Figure 3:
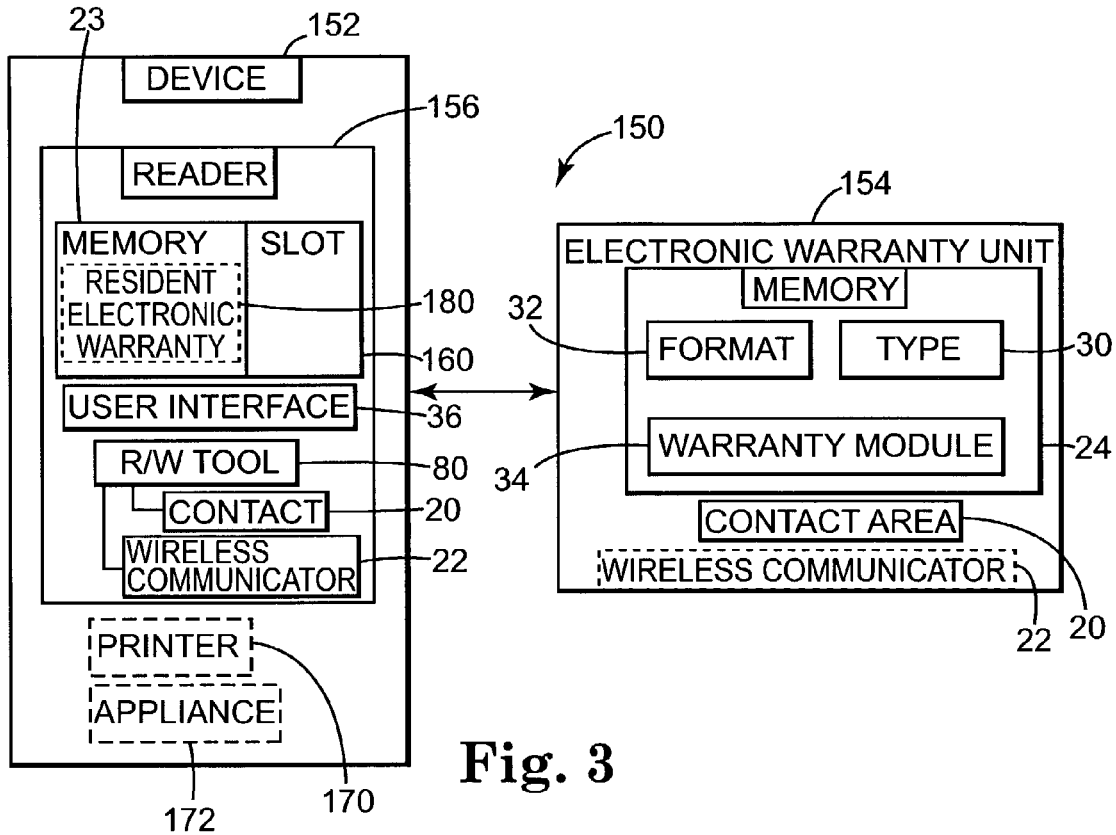
FIG. 3 is a block diagram illustrating an electronic warranty system, according to one embodiment of the present invention.

As shown in FIG. 3, electronic warranty system 150 includes device 152 and electronic warranty unit 154. Device 152 includes reader 156, which includes memory 23, user interface 36, and R/W tool 80, as well as contact area 20 and optional wireless communicator 22. Reader 156 has substantially the same features and attributes as reader 14, as previously described in association with FIG. 1. Reader 14 also further includes slot 160, which is in electrical communication with R/W tool 80 and acts as a receiving mechanism for receiving removable insertion of electronic warranty unit 154. Electronic warranty unit 154 includes memory 24 with memory type 30, memory format 32 and warranty module 34. Electronic warranty unit 154 has substantially the same features and attributes as memory 24 of electronic warranty unit 12, including contact area 20 and an optional wireless communicator 22.

System 150 is a combination of device 152 and electronic warranty unit 154 in which reader 156 is incorporated into device 152 and electronic warranty unit 154 is inserted into slot 160 of reader 156 to establish an electronic warranty for device 152. Electronic warranty unit 154 preferably is inserted into slot 160 as memory card 50 (e.g. single in-line memory module (simm), dual in-line memory module (dimm)), although other forms of removably insertable memory cards such as Smartcard, Flash memory cards, etc. can also be used. In addition, electronic warranty unit 154 can be embodied as chip 56 of memory format 32, which may already be part of memory 23 of device 152 or which is installed to be added to memory 23. Electronic warranty unit 154 may have some or all of the warranty information already programmed into electronic warranty unit 154 prior to installation in device 152, or merely provide a warranty template for later programming of the warranty information into electronic warranty unit 154 after it is installed into device 152.

Alternatively, the electronic warranty in electronic warranty unit 154 is copied or read into memory 23 of reader 156 to establish a warranty for device 152. To do so, electronic warranty unit 154 is inserted into slot 160 for a period of time long enough to transfer its contents into memory 23 of device 152 via R/W tool 80 and then electronic warranty unit 154 is removed. In addition, if device 152 and electronic warranty unit 154 are each equipped with optional wireless communicator 22, wireless transfer of the electronic warranty also can be performed between the respective wireless communicators 22 when electronic warranty unit 154 is brought into close proximity to reader 156 of device 152.

In alternate arrangement, as shown in FIG. 3, an electronic warranty can already be stored in memory 23 of the device as resident electronic warranty 180 (i.e. already on board the device) but not yet activated. Upon insertion of electronic warranty unit 154, resident warranty 180 in memory 23 is activated and optionally supplemented with any warranty parameters from electronic warranty unit 154. Insertion of electronic warranty unit 154 also optionally triggers instant electronic registration at a warranty service provider (such as warranty service provider 226 via network communication link 226, as later described in association with FIG. 5). Finally, the electronic warranty also can be registered at the time of purchase of electronic warranty unit 154 so that insertion of electronic warranty unit 154 into warranted device 152 activates resident warranty 180 (in memory 23) with a registered status.

Device 152 optionally is embodied as printer 170 or appliance 172. An embodiment of device 152 as printer 170 is described further in association with FIG. 5. Appliance 172 includes virtually any device for performing a function such as a kitchen appliance, household appliance, yard appliance, etc. for which a warranty can be offered.

Figure 4:
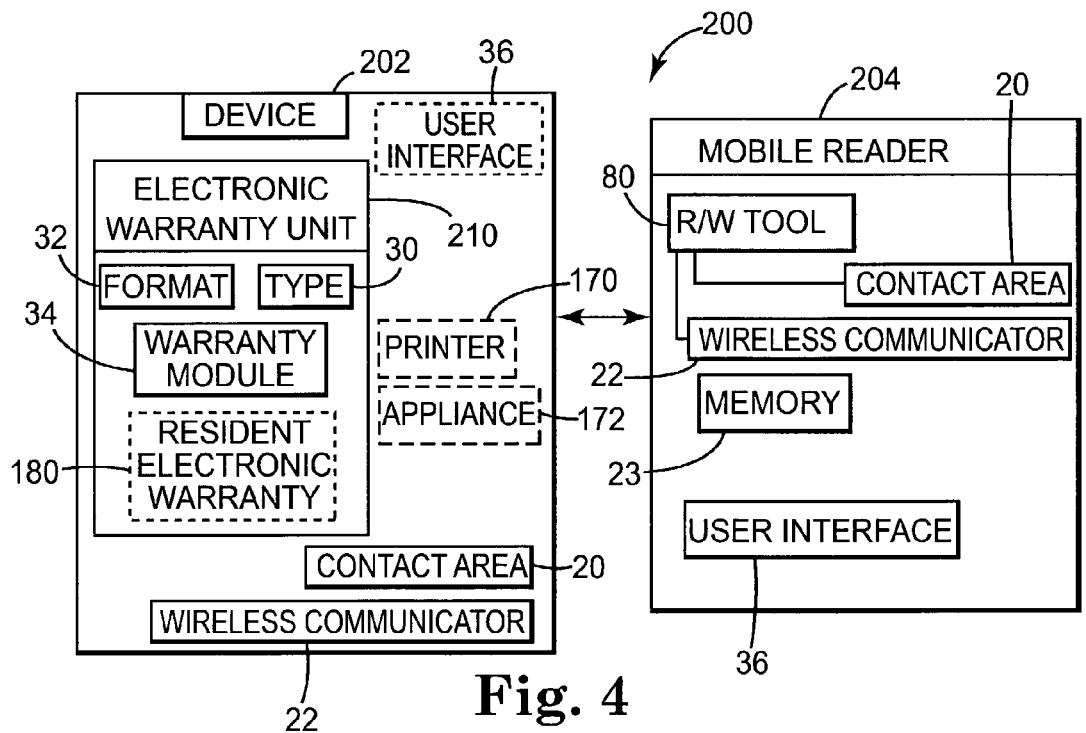
FIG. 4 is a block diagram illustrating an electronic warranty system, according to one embodiment of the present invention.

As shown in FIG. 4, electronic warranty system 200 includes device 202 and mobile reader 204. Device 202 includes R/W tool 80 and electronic warranty unit 210 comprising memory format 30, memory type 32, and warranty module 34. In addition, device 202 includes contact area 20 and optional wireless communicator 22 for communicating with reader 204. Device 202 also optionally is embodied as printer 170 or appliance 172, as in FIG. 3. Mobile reader 204 includes memory 23, user interface 36, and R/W tool 80, which is linked to contact area 20 and optional wireless communicator 22.

Electronic warranty system 200 is a combination of device 202 and mobile reader 204 in which electronic warranty unit 210 is embodied in or on device 202 and mobile reader 202 is used to read from and/or write to electronic warranty unit 210 (in device 202) for servicing device 202. Device 202 typically comprises an appliance 172, which requires servicing by a technician. The technician uses reader 204 to identify warranty information, service history, and/or service warnings of device 202 stored in electronic warranty unit 210. The technician then performs any necessary service on device 202. The current servicing information, and any warranty updates regarding the service, is written from reader 204 into electronic warranty unit 210 of device 202. Some or all of this service and warranty information for device 202 is stored in memory 23 of mobile reader 204 for later downloading at a central service/warranty facility for storage and tracking by the retailer, manufacturer, and/or warranty service provider of device 202.

Electronic warranty unit 210 may be embodied in device 202 in any one of the memory formats 32 (see FIG. 1), such as a memory card 50. In one example, electronic warranty unit 12 is embodied as electronic label 52, which is applied to an external surface of appliance 172, such as a refrigerator. The technician brings mobile reader 204 into direct contact with electronic warranty unit 210 to exchange warranty information via contact areas 20 of electronic warranty unit 210 and reader 204. Wireless communicators 22 of mobile reader 204 and of electronic warranty unit 210 are optionally used to exchange electronic warranty data when reader 204 is brought into close proximity with device 202. User interface 36 of mobile reader 204 is used to monitor and control exchange of electronic warranty data between each device 202 and reader 204. Device 202 optionally includes its own user interface 36 to permit the owner of device 202 to facilitate accessing warranty information on electronic warranty unit 210.

When electronic warranty unit 210 is embodied as electronic label 52, electronic label 52 is applied as a tape that is adhesively fixed to a surface of device 202. Alternatively, electronic label 52 is applied to a card that is removably inserted into a sleeve affixed to a surface of device 202.

Figure 5:
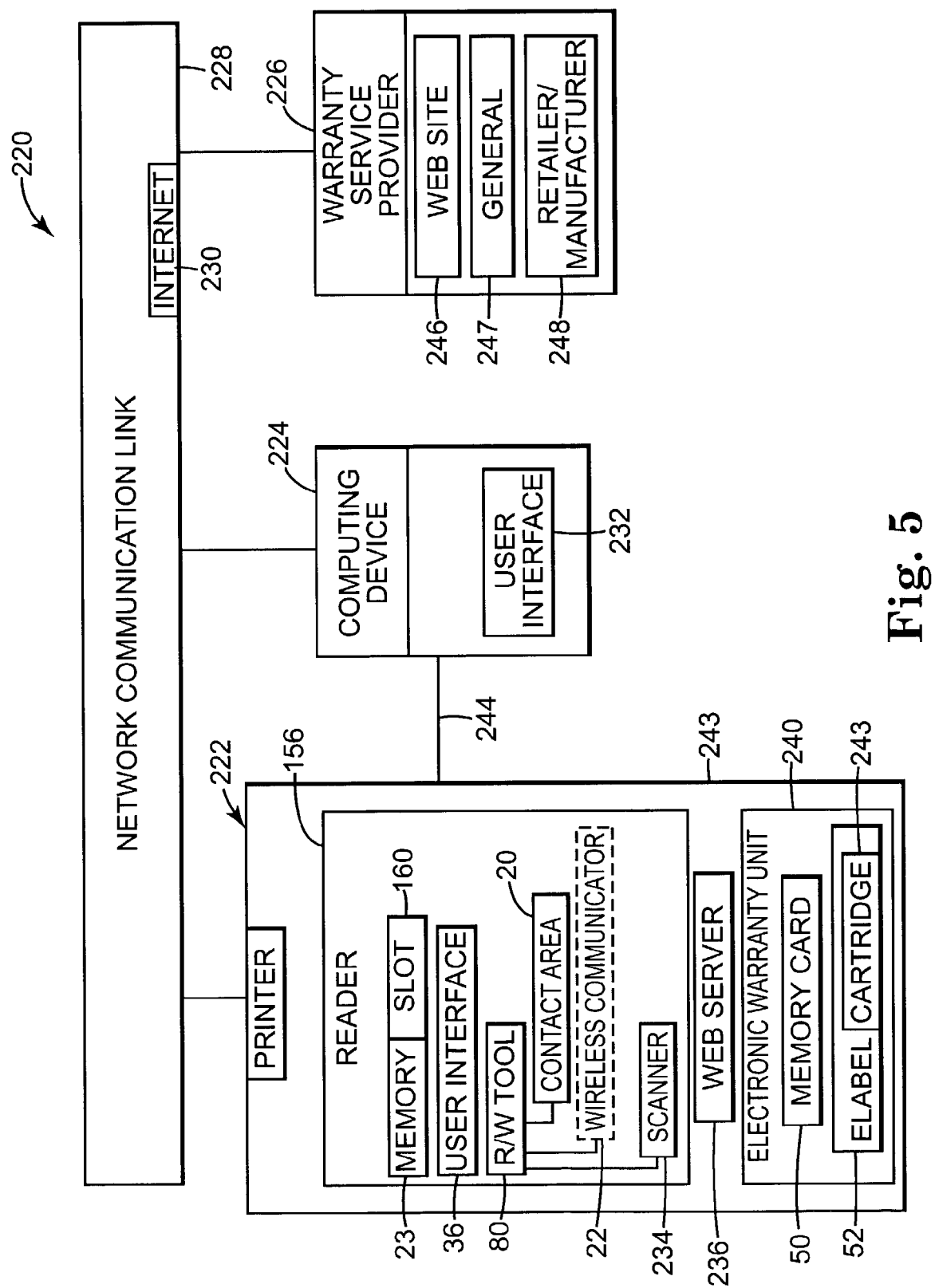
FIG. 5 is a block diagram illustrating an electronic warranty system including a printer, according to one embodiment of the present invention.

FIG. 5 illustrates electronic warranty system 220, which facilitates obtaining, installing, and registering an electronic warranty for a printer. As shown in FIG. 5, electronic warranty system 220 includes printer 222, computing device 224 with user interface 232, warranty service provider 226 and network communication link 228 with Internet link 230. Printer 222 includes reader 156, optional embedded web server 236, and electronic warranty unit 240. Reader 156 includes memory 23, user interface 36, R/W tool 80, contact area 20 and optional wireless communicator 22. Reader 156 optionally includes optional scanner 234. Electronic warranty unit 240 and reader 156 include substantially the same features and attributes as electronic warranty unit 12 and reader 14, respectively, as previously described in association with FIG. 1.

Electronic warranty unit 240 comprises memory card 50 that is permanently part of printer 222 or removably insertable into printer 222. Memory card 50 preferably is a single in-line memory module (simm), dual inline memory module (dimm), or other removably insertable memory unit Electronic warranty unit 240 also optionally comprises electronic label 52 which is applied to an exterior of printer 222 or optionally applied to cartridge 243, such as an ink jet printer cartridge. When applied to an ink jet cartridge, electronic label 52 preferably is incorporated into the flexible circuitry already commonly used on ink jet print cartridges, such as those available from Hewlett-Packard, Inc. of Palo Alto, Calif.

Computing device 224 comprises a personal computer, personal digital assistant, handheld computer, notebook computer, etc. capable of communicating with and supporting printer 222. User interface 232 has substantially the same features and attributes as user interface 36 and permits monitoring printer 222, including control over and access to electronic warranty in electronic warranty unit 240 in printer 222. Direct link 244 represents a direct electrical communication connection between printer 222 and computing device 224.

Warranty service provider 226 comprises web site 246, general warranty provider 247, and retailer/manufacturer warranty provider 248. Warranty service provider 226 includes any entity that provides warranties for printer 222, whether web-based or non-web based. Web site 246 comprises a site on the World Wide Web for obtaining, registering, and/or updating an electronic warranty within electronic warranty unit 240 of printer 222. Warranty service provider 226 is embodied as a retailer and/or manufacturer 248 of printer 22 or as a general warranty provider 247 that provides warranties for products without having manufactured or sold printer 222.

Network communication link 228, as used herein, includes an Internet communication link (e.g., the Internet), an intranet communication link, or similar high-speed communication link. In one preferred embodiment, network communication link 228 includes an Internet communication link 230. Network communication link 228 permits communication between printer 222 (including electronic warranty unit 240), computing device 224, and warranty service provider 226.

In use, electronic warranty unit 240 is purchased from a retail point-of-purchase environment and then installed in printer 222. As previously described in association with FIGS. 1-4, electronic warranty unit 240 is preferably installed into slot 160 or applied a surface of printer 222 as an electronic label 52. Electronic warranty unit 240 also optionally is used to read the electronic warranty into printer 222 into memory 23 of reader 156 via wireless communicator 22 without actually installing electronic warranty unit 240 into printer 222.

Once electronic warranty unit 240 is installed, user interface 232 of computing device 224 and/or user interface 36 of printer 222 are used to access and monitor the electronic warranty in electronic warranty unit 240. With user interface 232 of computing device 224, an operator of printer 222 can contact warranty service provider 226 through network communication link 228 to register electronic warranty unit 240 to activate the warranty for printer 222, as well as modify the warranty, and/or purchase additional warranties. Additional methods of interacting with warranty service provider 226 for obtaining an electronic warranty are described further in association with FIGS. 8 and 9. Moreover, embedded web server 236 is optionally used for communicating with computing device 224 and/or warranty service provider 226 regarding warranty information on electronic warranty unit 240.

Any of device 152 and 202, can be substituted in place of printer 222 as part of system 220 that includes network communication link 228, computing device 224 and/or warranty service provider 226.

Figure 6:
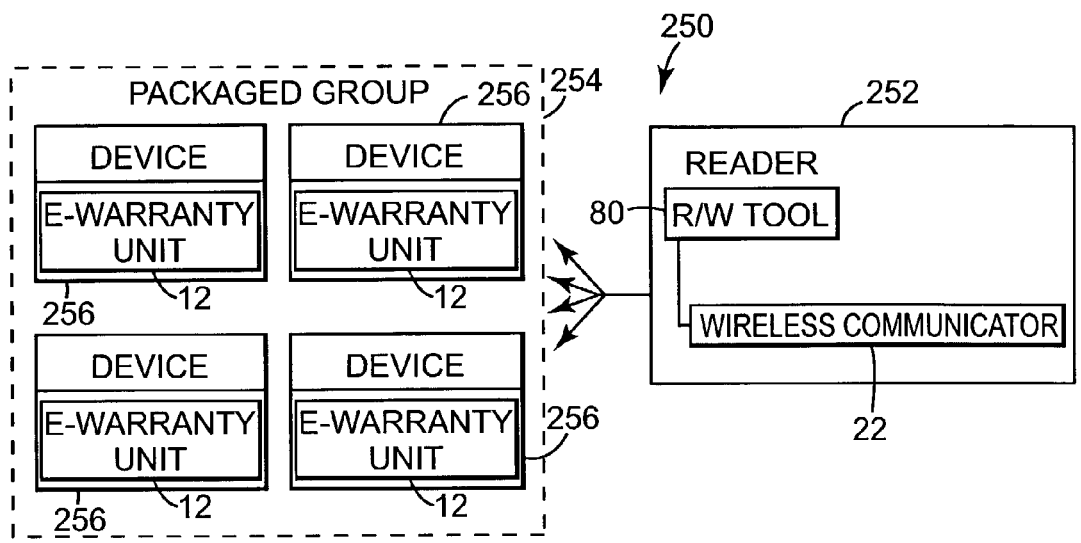
FIG. 6 is a block diagram illustrating an electronic warranty system for multiple devices, according to one embodiment of the present invention.

As shown in FIG. 6, electronic warranty system 250 comprises reader 252 including R/W tool 80 with wireless communicator 22 and packaged group 254 of devices 256. Each device 256 includes electronic warranty unit 12. In electronic warranty system 250, reader 252 is used to wirelessly register a plurality of electronic warranty units 12 within packaged group 254 of devices 256. For example, devices 256 optionally are a plurality of printers held on a pallet for delivery. Before the printers are shipped to the customer, reader 252 is brought into close proximity to devices 256 to wireless communicate with electronic warranty units 12 to simultaneously register, update, and/or program an electronic warranty for devices 256. Electronic warranty unit 12 and reader 252 have substantially the same features and attributes as electronic warranty unit 12 and reader 14, respectively, as previously described in association with FIG. 1. Finally, reader 252 can be either stationary or mobile.

Electronic warranty unit 12 is purchasable at a retail point-of-purchase environment 300. As shown in FIG. 7, retail point-of-purchase environment 300 includes vending machine 302, personal sales station 304, programmable electronic warranty units 306, and pre-programmed electronic warranty units 308. Vending machine 302 includes user interface 36, R/W tool 80 with contact area 20 and optional wireless communicator 22, validator 320, programmer 322, pre-programmed electronic warranty units 306, programmable electronic warranty units 308, and electronic payment mechanism 310. Programmer 322 comprises memory type 30, memory format 32, and warranty module monitor 35. Personal sales station 304 comprises R/W tool 80 with contact area 20 and optional wireless communicator 22, validator 320, and programmer 322.

Vending machine 302 allows a purchaser to obtain an electronic warranty unit 306,308 without interacting with a salesperson. User interface 36, supported by programmer 322, allows the purchaser to preview and select different warranty products and optionally customize the terms of electronic warranty (e.g. duration). For example, a purchaser can select memory type 30, memory format 32 and the parameters of the electronic warranty as expressed in warranty module 34.

Programmer 322 can determine some or all of the parameters of the warranty, subject to constraints and criteria established by warranty service provider 226 (FIG. 7). Validator 320 activates an electronic warranty and triggers electronic registration of the warranty.

With user interface 36, a purchaser also optionally enters their personal information as well as information about the warranted device, such as serial number, model number, etc. pre-programmed electronic warranty units 306 can be purchased which already include an electronic warranty with pre-established terms for the warranted device stored on electronic warranty unit 306. Programmable electronic warranty units 308 lack specific warranty information but include a warranty template for receiving terms of the electronic warranty for storage into electronic warranty unit 308. The terms of the warranty are selected by the purchaser through user interface 36, within established constraints and criteria established by the warranty service provider 226, and then written to electronic warranty unit 208 via programmer 322 and R/W tool 80.

Personal sales station 304 facilitates a retail salesperson to sell an electronic warranty embodied as a pre-programmed electronic warranty unit 306 or a programmable electronic warranty unit 308. These units 306,308 are selected by a purchaser and brought to personal sales station 304. With user interface 36, which is supported by programmer 322 with R/W tool 80, an attendant can program a programmable electronic warranty unit 306 with the terms preferred by the purchaser (within constraints set by the warranty provider) and electronically register the warranty with validator 320. Programmable electronic warranty unit 306 optionally includes a warranty template that pre-specifies the available terms and constraints of any warranty to be programmed into unit 306. If a pre-programmed electronic warranty unit 308 is purchased, the attendant can use validator 320 to electronically register the warranty and optionally use programmer 322 to customize the parameters of the electronic warranty on pre-programmed unit 308

Once a pre-programmed electronic warranty unit 306 or programmed electronic warranty 308 is purchased and the warranty established, validator 320 activates the purchased electronic warranty unit 306,308 and optionally electronically registers the electronic warranty for that purchaser at warranty service provider 226 (FIG. 7).

Figure 8:
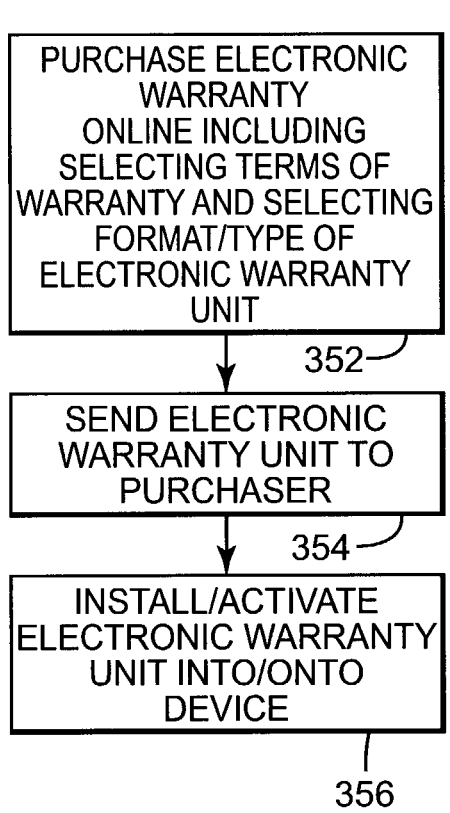
FIG. 8 is flow diagram illustrating a method of electronically warranting a device, according to one embodiment of the present invention.

In another exemplary embodiment of the present invention, a method 250 of purchasing an electronic warranty by Internet is shown in FIG. 8. Method 350 includes first step 352 of purchasing an electronic warranty online (or optionally by telephone) from warranty service provider 226, such as from web site 246 (FIG. 5). Step 352 includes selecting the parameters of the warranty and selecting the format and/or type of memory housing electronic warranty unit 12. This step is performed at web site 246 (FIG. 5) or over the phone with a customer service representative of warranty service provider 226. Next, in step 354, the electronic warranty unit is sent to the purchaser by mail or other delivery method. Finally, in step 356, the purchaser installs the electronic warranty unit 12 into and/or onto the warranted device. Each electronic warranty unit 12 is programmed to trigger automatic registration upon insertion and installation within the warranted device.

Figure 9:
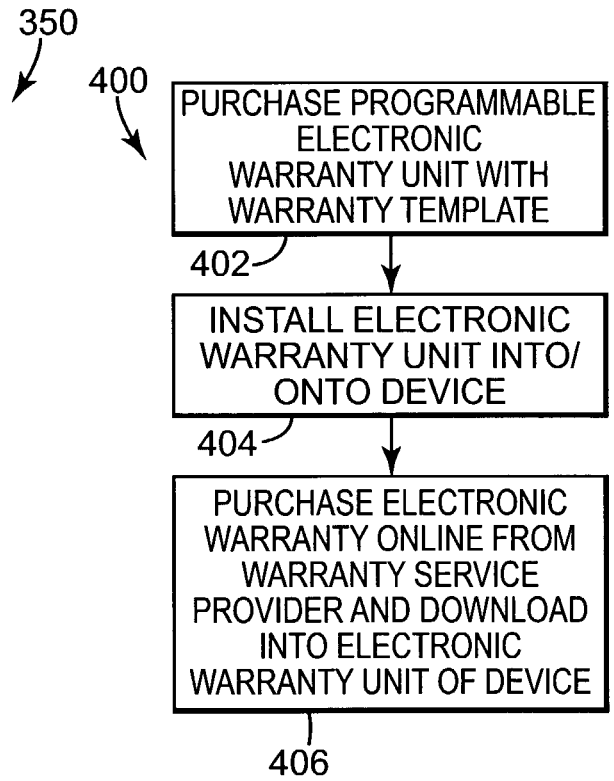
FIG. 9 is flow diagram illustrating a method of electronically warranting a device, according to one embodiment of the present invention.

As shown in FIG. 9, method 400 of purchasing an electronic warranty includes step 402 of purchasing electronic warranty unit 12 with a programmable warranty template. For example, the purchase can be made at a retail outlet or by direct mail. Next, in step 404, the purchaser installs programmable electronic warranty unit 12 into and/or onto the warranted device. Finally, with programmable electronic warranty unit 12 installed, an electronic warranty is purchased online from warranty service provider 226 and downloaded and written into electronic warranty unit 12 of the warranted device. The downloaded software and/or information optionally is validated upon the downloaded software recognizing an authorized electronic warranty unit 12 by its serial number 25 or other unique identifier.

With an electronic warranty system and method of the present invention, a purchaser can control purchase of the warranty and registration occurs electronically at or near the time of purchase. The electronic warranty is always with the device and accessible by the technician and consumer alike. A warranty provider benefits by increased registration as well as more precise and accurate tracking of servicing.

While specific embodiments have been illustrated and described, herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A printer electronic warranty unit comprising:
a programmable electronic memory unit including at least one of a memory card and a memory chip;
a printer ink cartridge on which the electronic memory unit is attached and that is removably insertable into a printer; and
an electronic warranty template stored on the electronic memory unit and including a plurality of warranty parameter fields configured to be programmed as an electronic warranty for the printer,
wherein the printer ink cartridge is configured to communicate the electronic warranty to the printer upon removable insertion of the printer ink cartridge into the printer.

2. A printer electronic warranty unit comprising:
an electronic warranty label including a memory storing a printer electronic warranty, the electronic warranty label comprising flexible circuitry; and
a printer ink cartridge on which the electronic warranty label is affixed, the printer ink cartridge being removably insertable into a printer,
wherein the flexible circuitry is configured to communicate the stored printer electronic warranty to the printer upon removable insertion of the printer inkjet cartridge into the printer.

3. An electronic warranty unit of an appliance comprising:
an electronic warranty label including a memory storing an electronic warranty for the appliance, the electronic warranty label comprising flexible circuitry; and
a replaceable component of the appliance on which the electronic warranty label is adhered, the replaceable component being removably insertable into the appliance,
wherein the flexible circuitry is configured to communicate the electronic warranty to the appliance upon the removable insertion of the replaceable component into the appliance.

4. The electronic warranty unit of claim 3, wherein the appliance comprises a printer and wherein the replaceable component comprises a replaceable printer component of a printer.

5. The electronic warranty unit of claim 4, wherein the replaceable printer component is a printer ink cartridge.

6. An electronic warranty system comprising:
an appliance electronic warranty embodied in a flexible circuitry label; and
a replaceable component of an appliance, wherein the replaceable component is removably insertable into the appliance,
wherein the flexible circuitry label is affixed onto the replaceable component and is configured to communicate the appliance electronic warranty to the appliance upon the removable insertion of the replaceable component into the appliance.

7. The electronic warranty system of claim 6, further comprising the appliance into which the replaceable component is removably insertable.

8. The electronic warranty system of claim 6, wherein the appliance is a printer and the replaceable component is a printer ink cartridge.

\* \* \* \* \*